(No Model.)
D. C. MALONY & J. SCHRENK.
CULTIVATOR.
No. 369,799. Patented Sept. 13, 1887.
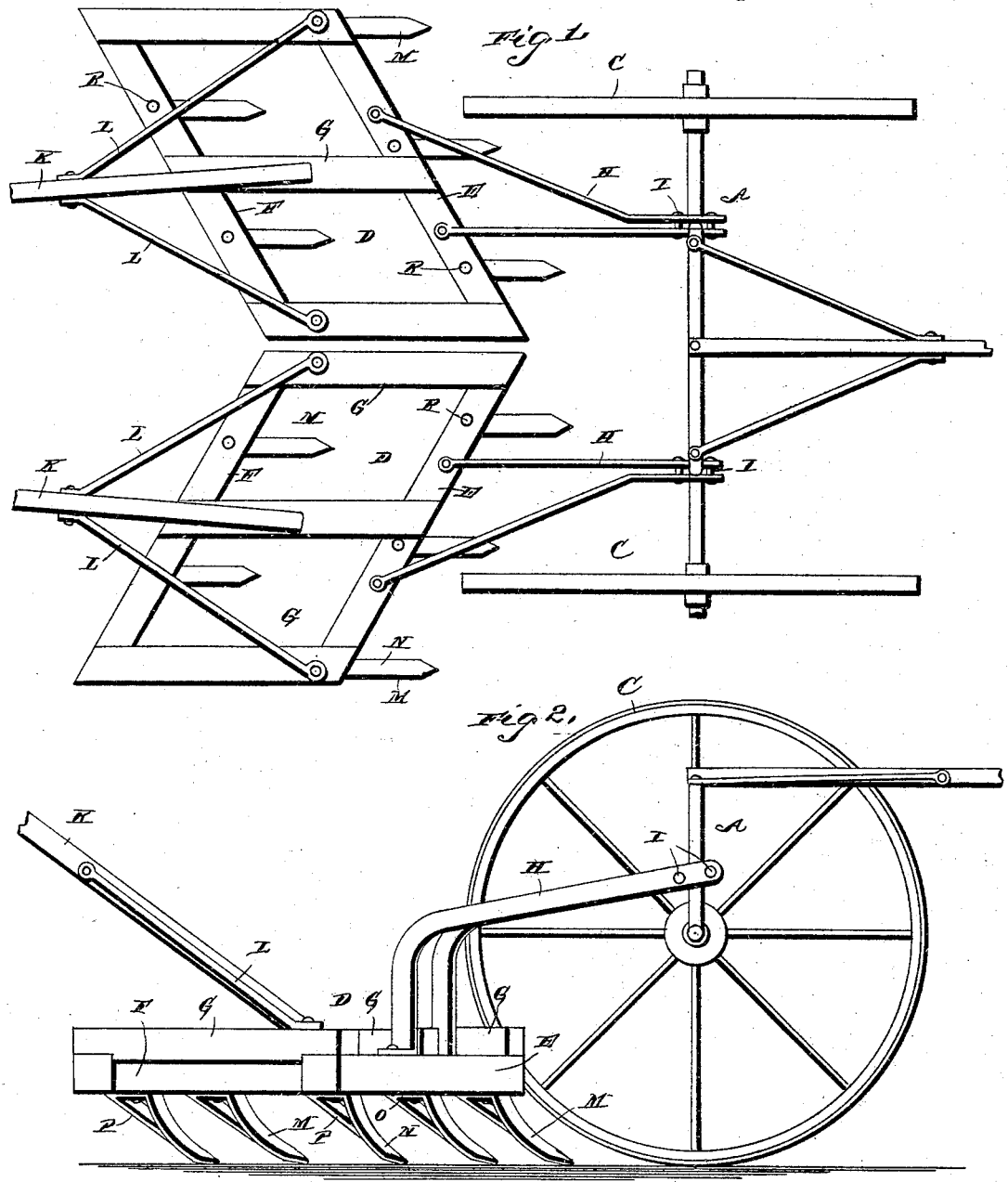

UNITED STATES PATENT OFFICE.

DAVID C. MALONY AND JAKOB SCHRENK, OF BRUNSWICK, MISSOURI.

CULTIVATOR.

SPECIFICATION forming part of Letters Patent No. 369,799, dated September 13, 1887.

Application filed June 29, 1887. Serial No. 242,898. (No model.)

*To all whom it may concern:*

Be it known that we, DAVID C. MALONY and JAKOB SCHRENK, citizens of the United States, residing at Brunswick, in the county of Chariton and State of Missouri, have invented a new and useful Improvement in Cultivators, of which the following is a specification.

Our invention relates to an improvement in cultivators; and it consists in the peculiar construction and combination of devices, that will be more fully set forth hereinafter, and particularly pointed out in the claim.

In the accompanying drawings, Figure 1 is a top plan view of a cultivator embodying our improvements, showing the same attached to a sulky-frame. Fig. 2 is a side elevation of the same with the near wheel of the sulky removed. Fig. 3 is a detached perspective view of one of the cultivator-teeth.

A represents a sulky-frame of the usual construction, which is provided with the usual supporting-wheels, C.

D represents a pair of cultivator frames, each of which comprises the front and rear oblique parallel bars, E and F, and the longitudinal bars G, which connect the said bars E and F at the ends and centers thereof.

It will be observed by reference to Fig. 1 that the cultivator-frames are arranged side by side, and that the oblique bars thereof project in opposite directions from the center of the sulky and extend rearwardly at a suitable angle. To the front bar, E, of each cultivator-frame is bolted a pair of curved beams, H, which extend forward therefrom, and have their front ends attached to the sulky, as shown, by means of pivotal bolts I, whereby the cultivator-frames are adapted to move vertically independently of each other.

To the central bar, G, of each cultivator-frame is attached a handle, K, which is similar to a plow-handle, and extends upward and rearward from the frame.

L represents a pair of braces with which each cultivator-frame is provided. The said braces have their outer ends attached to the bars G at the ends of the frames and their inner ends bolted to opposite sides of the handles. By means of these handles the cultivator-frames may be directed by a plowman walking in rear of the machine and having one hand on each handle.

M represents a series of cultivator-teeth, which are attached to the bars E and F of the cultivator-frames. Each cultivator-tooth is made from a single piece of metal of suitable width and thickness, which is first curved to form the tongue N, is then bent rearward to form the horizontal arm or plate O, adapted to bear under the bar, and is then bent at the rear end of the said plate or arm to form an inclined brace, P, which extends downward and forward and bears against the rear side of the tongue. The lower front end of the tongue is beveled on opposite sides, and thereby provided with a sharpened point, as shown. It will be observed that the brace-arms P serve to strengthen the tongues of the cultivator-teeth, and thereby enable the latter to withstand the strain to which they are subjected and thereby prevent them from being bent rearwardly and becoming broken.

The arm O of each cultivator-tooth is provided with one or more openings, through which vertical bolts R are passed in order to secure the plates or arms to the under sides of the bars E and F.

The teeth attached to the front bars of the cultivator are out of line with those attached to the rear bars thereof.

A cultivator thus constructed is cheap and simple, is very strong and durable, and is adapted to thoroughly stir the soil between rows of plants and preserve the same in a level condition. Owing to the fact that the teeth on the rear beams of the cultivator-frames are out of line with the front teeth, the teeth are arranged to operate in the soil with maximum efficiency.

The teeth may be attached to the front and rear bars of the cultivator-frames at any desired angle, if preferred, and thereby caused to run diagonally to the line of draft to throw the soil in either direction.

Having thus described our invention, we claim—

The cultivator-frames having the oblique parallel front and rear bars and the cultivator-teeth attached to the under sides of the said bars, the said teeth being each made from a single piece of metal curved to form the tongue N and then bent rearward and downward to form the arm or plate O, and the brace-arm P, connecting the rear end of said plate and the tongue, substantially as described.

In testimony that we claim the foregoing as our own we have hereto affixed our signatures in presence of two witnesses.

DAVID C. MALONY.
JAKOB SCHRENK.

Witnesses:
W. N. REYNOLD,
J. H. HEISEL.